Figure 1:
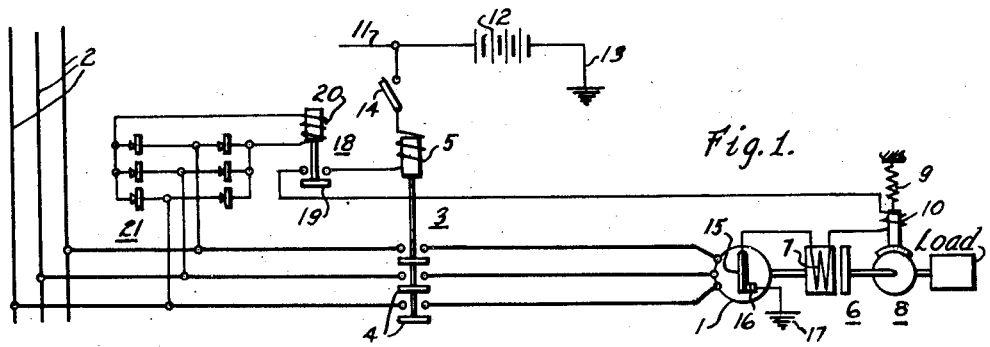

INVENTOR
Cyril G. Veinott.

Patented Aug. 19, 1947

2,426,071

UNITED STATES PATENT OFFICE 2,426,071

ALTERNATING-CURRENT MOTOR SYSTEM

Cyril G. Veinott, Lima, Ohio, assignor to Westinghouse Electric Corporation, East Pittsburgh, Pa., a corporation of Pennsylvania Application October 28, 1943, Serial No. 508,055

13 Claims. (Cl. 192—.02)

1

The present invention relates to alternating-current motors provided with a brake and connected to the load either directly or by means of a clutch, and it relates, more particularly, to control means for such motors.

There are numerous applications for electric motors in which the load, or driven device, must be stopped as soon as the motor is deenergized and must be positively held in position. One such application is in the case of motors used on aircraft. Many of the loads driven by aircraft motors, such as control surfaces, must be accurately stopped at a desired point in their movement, and must be positively held in position. Brakes are used for this purpose, and in many cases the motor is connected to the load by means of a clutch which is disengaged as soon as the motor is deenergized in order to permit more rapid stopping of the driven device especially where most of the rotational inertia is in the motor armature.

In such motor systems, the brake is released and the clutch engaged only while the motor is running, and the brake and clutch are operated by means of solenoids. When direct-current motors are used, the design of such a system presents no particular difficulties since the brake and clutch solenoids can be energized directly from the motor circuit. If alternating-current motors are used, however, such a simple arrangement is not so satisfactory because of the greater weight of alternating-current solenoids, especially at the relatively high frequencies, such as 400 cycles, used in alternating-current systems on aircraft. For example, a 400-cycle alternating-current solenoid weighs about three times as much as a direct-current solenoid designed to perform the same function. This increase in weight is extremely undesirable in aircraft equipment, and in many cases is not permissible.

The principal object of the present invention is to provide an alternating-current motor for aircraft use provided with a brake and clutch in which the brake is applied and the clutch disengaged immediately upon deenergization of the motor, and the brake is released and the clutch engaged when the motor is started, and in which the brake and clutch are actuated by direct-current solenoids, so that relatively light-weight solenoids can be used.

Another object of the invention is to provide an alternating-current motor for aircraft use having a brake and a clutch in which the brake is released and the clutch engaged only during operation of the motor, and in which the energiza-

2 tion of the motor and the operation of the brake and clutch are controlled by direct-current solenoids.

A further object of the invention is to provide an alternating-current motor having a brake and clutch in which the brake is released and the clutch engaged by means of solenoids energized by direct current when the motor is started, and in which means are provided for positively preventing release of the brake and engagement of the clutch in case of failure of the alternating-current supply to the motor.

Still another object of the invention is to provide an alternating-current motor having a brake and clutch in which thermally-responsive protective means are provided in the motor for deenergizing the motor and causing the brake to be applied and the clutch disengaged in response to excessive heating of the motor.

Figure 2:
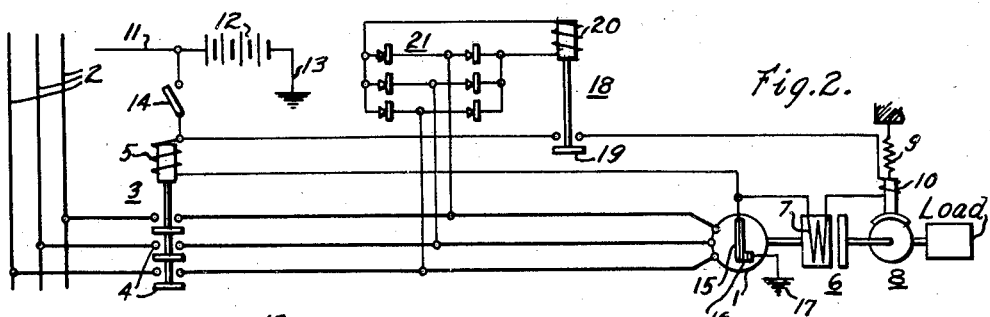
Figure 3:
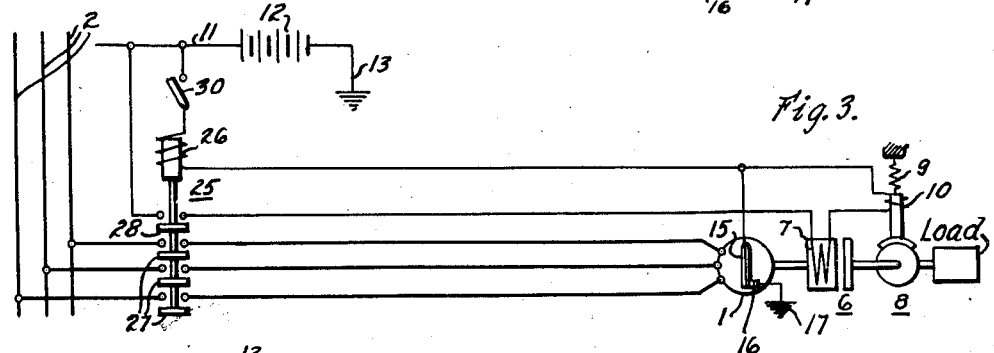
Figure 4:
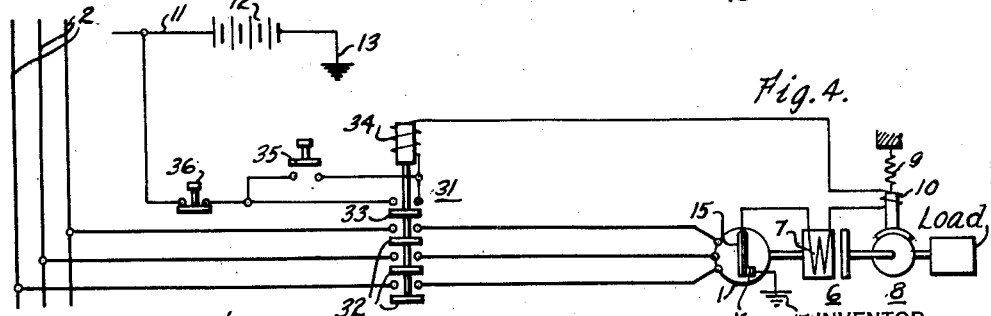

The invention will be more fully understood from the following detailed description, taken in connection with the accompanying drawing, in which:

Figure 1 is a schematic wiring diagram showing one embodiment of the invention; and Figs. 2, 3, and 4 are similar diagrams showing other embodiments of the invention.

Fig. 1 shows an alternating-current motor 1, which has been shown as a three-phase motor of any suitable type, although the invention is also applicable to other types of motors, such as single-phase motors. The motor 1 is supplied from a three-phase supply line 2, and a contactor 3 is provided for controlling the energization of the motor. The contactor 3 has a plurality of contacts 4 connected between the motor 1 and the line 2 and has an operating coil 5 arranged so that when the coil 5 is energized, the contactor 3 closes its contacts to connect the motor to the line. The motor 1 is connected to the load which it drives by means of a clutch 6, which may be of any suitable type, and which is arranged so that it is normally held in the disengaged position, as by a spring or other suitable means. The clutch 6 has an operating coil or solenoid 7 which moves the clutch to the engaged position when the coil 7 is energized, so as to connect the motor to the load. A brake 8 is also provided which is disposed to prevent rotation of the load when the brake is applied. As shown diagrammatically, the brake is normally maintained in braking position, as by means of a spring 9, and is provided with an operating coil or solenoid 10 which releases the brake when it is energized.

The operating coil 5 of the contactor 3, the clutch operating coil 7, and the brake operating coil 10 are all energized from a source of direct current, which is indicated as a direct-current bus 11. The bus 11 represents any source of direct current which is available on the airplane, and is shown as being supplied from a source of direct current, such as a battery 12, one terminal of which is connected to the bus 11, and the other terminal grounded at 13. The operating coils 5, 7, and 10 are connected in series to the bus 11 through a control switch 14, which may be either manually or automatically operated.

The series circuit comprising the operating coils also includes a thermally-responsive protective device 15 mounted in any suitable position in or on the motor 1 so as to be responsive to excessive heating of the motor resulting from overload or any other cause. The thermally-responsive device 15 has normally closed contacts 16, and it is adapted to open these contacts in response to excessive heating of the motor. The contacts 16 of the protective device 15 are connected in series with the brake and clutch operating coils 10 and 7, and are connected to ground at 17 to complete the energizing circuit for the operating coils. It will be apparent, therefore, that when the control switch 14 is closed, the operating coils 5, 7, and 10 will all be simultaneously energized, and the brake will be released and the clutch engaged while the motor is simultaneously connected to the line 2, thus permitting the motor to drive the load.

Since the operating coils for the contactor 3, clutch 6, and brake 8 are energized from a direct-current source which is independent of the alternating-current supply to the motor, it would be possible, in case of failure of the alternating-current supply, for the clutch to be engaged and the brake released, but the motor not energized. This would be a very undesirable condition, and in the case of certain types of driven devices on an airplane might be dangerous. In order to prevent the occurrence of such a condition, a voltage-responsive relay 18 is provided. The relay 18 has a contact 19, which is connected in the series circuit with the operating coils 5, 7, and 10, and has an operating coil 20 which is actuated in response to the voltage applied to the motor 1. In the particular embodiment shown in the drawing, the coil 20 is supplied from a three-phase bridge-type rectifier 21 which is connected across the three-phase supply to the motor 1. Such a rectifier and relay combination can be designed to cause the relay 18 to drop out and open its contact 19 either in response to a failure of all three phases of the alternating-current supply, or in response to a failure of only one phase, as desired.

In the operation of this system, when the motor is deenergized and at rest, and the coils 7 and 10 are also deenergized, the clutch 6 is disengaged and the brake 8 is applied so that the load is positively held against movement. When it is desired to drive the load, the control switch 14 is closed. If the alternating-current supply line 2 is energized so that a voltage is applied to the rectifier 21, the relay 18 has its contact 19 closed, and closing of the control switch 14 completes a series circuit from the direct-current bus 11 through the operating coils 5, 10, and 7 and the protective device 15 to ground. Energization of the coil 5 causes the contactor 3 to close its contacts 4, connecting the motor 1 to the line, and the simultaneous energization of the coils 7 and 10 causes the clutch 6 to be engaged and the brake 8 to be released so that the motor can drive the load. When the switch 14 is opened to stop the motor, all three operating coils are immediately deenergized, and the contactor 3 drops out to disconnect the motor from the line. Substantially simultaneously, the clutch 6 returns to its disengaged position, and the brake 8 is applied so that the load is immediately stopped and held in position.

If a failure of the alternating-current supply to the motor 1 should occur, the resulting absence of voltage on the relay coil 20 will cause the relay 18 to drop out and open its contact 19, interrupting the circuit to the brake and clutch operating coils 10 and 7. Thus, these coils cannot be energized and the clutch remains disengaged and the brake applied whether the switch 14 is open or closed. In case of excessive heating of the motor during operation, as a result of overloading or any other cause, the thermally-responsive device 15 is actuated to open its contacts 16, interrupting the circuit to the operating coils in the same manner and causing the motor 1 to be deenergized, the clutch 6 disengaged, and the brake 8 applied.

Thus, a relatively simple control system is provided which permits the use of direct-current solenoids to control the brake and clutch associated with an alternating-current motor, so that relatively light-weight solenoids can be used. In some cases, the clutch 6 is not necessary and may be omitted, and it will be apparent that the omission of the clutch does not affect the operation of the system. Similarly, the voltage-responsive relay 18 may be omitted in some cases, although it is usually desirable, and is often necessary, to include it in the system in order to prevent random movement of the load in case of failure of the alternating-current supply to the motor.

Fig. 2 shows a somewhat different embodiment of the invention which has certain advantages in many cases. In this embodiment, the motor 1, clutch 6, and brake 8 are similar to those shown in Fig. 1, and the motor is connected to the supply line 2 through the contactor 3 in the same manner as described above. In this case, however, the operating coil 5 of the contactor 3 is connected directly to the thermally-responsive device 15, while the clutch operating coil 7 and brake operating coil 10 are connected in a separate branch of the circuit in parallel with the coil 5. The contact 19 of the voltage-responsive relay 18 is preferably connected in series with the clutch and brake operating coils 7 and 10. It will be apparent that the operation of this form of the invention is substantially the same as that described above. Thus, closure of the control switch 14 effects simultaneous energization of the operating coils 5, 7, and 10 to connect the motor to the line and to cause engagement of the clutch and release of the brake substantially simultaneously with the starting of the motor. Opening of the relay contact 19 in response to failure of the alternating-current supply, and opening of the contacts of the thermally responsive device 15 in response to overheating of the motor, effect disengagement of the clutch and application of the brake in the same manner as described above. Operation of the protective device 15, of course, also effects deenergization of the motor.

The embodiment of the invention shown in Fig. 2 has the advantage that the voltage relay 18 can be placed close to the motor 1 to afford protection in case of failure of the alternating-current leads between the contactor 3 and the motor 1, since the rectifier 21 can be connected on the motor side of the contactor 3. This may be an important advantage in cases where the motor is placed at a distance from the contactor. The embodiment of Fig. 2 also has another advantage in that the coil 5 of the contactor 3 can be a standard coil designed for operation on the standard direct-current voltage of aircraft systems since it is not connected in series with the clutch and brake coils, as in Fig. 1 but is directly across the direct-current supply. The same advantage applies to the clutch and brake coils which can also be designed for the standard voltage without regard to the design of the contactor coil.

Fig. 3 shows another form of the invention in which the clutch and brake coils are controlled by an additional contact on the motor contactor. As shown in the drawing, the motor 1 is controlled by a contactor 25 having an operating coil 26. The contactor 25 has three contacts 27 for connecting the motor 1 to the three-phase line 2, and has an additional contact 28 which is connected in series with the clutch operating coil 7 and brake operating coil 10. The clutch and brake coils 7 and 10 are energized directly from the direct-current bus 11 and are connected through the thermally-responsive device 15 of the motor to ground at 29. One end of the contactor operating coil 26 is connected to the direct-current bus 11 by means of a control switch 30, and the other end of the coil 26 is connected to the protective device 15, so that the coil 26 is in parallel with the clutch and brake coils 7 and 10.

When the control switch 30 is closed, either manually or automatically, the coil 26 is energized and causes the contactor 25 to close its contacts 27 and 28. Closure of the contacts 27 connects the motor 1 to the line 2 to start it in operation, while closure of the contact 28 connects the coils 7 and 10 to the direct-current bus 11 to cause the clutch 6 to be engaged and the brake 8 to be released, thus permitting the motor to drive the load. It will be apparent that the thermally-responsive protective device 15 operates in the same manner as in the previously described embodiments of the invention to cause deenergization of the motor and of the clutch and brake coils in response to excessive heating of the motor.

If desired, a voltage-responsive relay similar to the relay 18 shown in Figs. 1 and 2 may be used with this embodiment of the invention with its contact connected in series in the circuit of the brake and clutch operating coils so as to interrupt the circuit of the coils 7 and 10 in response to failure of the alternating-current supply. Thus, this embodiment of the invention is essentially similar to those previously described but differs in that the brake and clutch coils are controlled by an additional contact on the motor contactor, so that a contactor must be used having one more contact than those used in the embodiments of Figs. 1 and 2.

Fig. 4 shows a further embodiment of the invention which is arranged for push-button control of the motor. In this figure, the motor 1 is connected to the line by a contactor 31, which may be similar to the contactor 25, and which has contacts 32 for connecting the motor to the line 2 and an additional holding contact 33. The contactor 31 has an operating coil 34 which is connected in series with the clutch and brake coils 7 and 10 and the protective device 15, and which is adapted to be energized from the direct-current bus 11. The motor is started by means of a normally open push-button 35. When the push-button 35 is moved to closed position, the coil 34 is connected to the direct-current bus 11, and the series circuit including the coil 34, the coils 7 and 10, and the protective device 15 is energized. The clutch is thus moved to engaged position, and the brake is released, and at the same time, the contactor 31 closes its contacts 32 to connect the motor 1 to the line so that it starts. The contact 33 of the contactor 31 is also closed at the same time and completes a holding circuit bypassing the push-button 35, so that it may be released as soon as the contactor has closed.

The motor is stopped by actuating the normally closed push-button 36, which interrupts the circuit to the coils 34, 7, and 10, and thus causes the contactor 31 to drop out, the clutch 6 to be disengaged and the brake 8 applied. The operation of the protective device 15 to cause stopping of the motor, disengagement of the clutch and application of the brake is the same as described above in connection with the other embodiments of the invention, and, if desired, a voltage relay can be used to provide protection against failure of the alternating-current supply. The voltage relay in this case would have to be connected in the manner shown in Fig. 1 on the line side of the contactor 31 with its contacts connected in series with the coil 34.

It should now be apparent that a control system has been provided for an alternating-current aircraft motor provided with clutch and brake in which the operation of the clutch and brake and the energization of the motor itself are controlled by means of direct-current solenoids, so that smaller and lighter solenoids can be used than would be possible with alternating-current control. It will also be apparent that various modifications may be made without departing from the spirit of the invention, and that the invention may be applied to motors and associated devices of various kinds. Thus, in some cases the clutch 6 may be omitted, and the motor connected directly to the load, with the brake 8 being used alone to stop the rotation of the load and motor. Similarly, in some cases the brake and clutch may be combined into a single device, and a single solenoid used for operation of both the brake and clutch. Where two coils are used to control the clutch and brake, as shown in the drawing, they may be connected to each other in series, as shown, or in parallel without affecting the operation of the system.

It is to be understood, therefore, that although certain specific embodiments of the invention have been shown for the purpose of illustration, it is not limited to these specific arrangements, but in its broadest aspects it includes all equivalent modifications and embodiments which come within the scope of the appended claims.

I claim as my invention:

1. In combination, an alternating-current electric motor, means for connecting said motor to a load, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, means for energizing said operating coils from a source of direct current which is substantially independent of the alternating-current supply to the motor, and means for preventing energization of at least said brake operating coil in case of failure of the alternating-current supply to the motor.

2. In combination, an alternating current electric motor, clutch means for connecting said motor to a load, said clutch means being normally disengaged, a clutch operating coil for effecting engagement of the clutch means, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, means for energizing said operating coils from a source of direct current which is substantially independent of the alternating-current supply to the motor, and means for preventing energization of at least said clutch and brake operating coils in case of failure of the alternating current supply to the motor.

3. In combination, an alternating-current electric motor, means for connecting said motor to a load, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, said operating coils being connected in a circuit, means for energizing said circuit from a source of direct current which is substantially independent of the alternating-current supply to the motor, and means responsive to the voltage applied to the motor for controlling the energization of said circuit.

4. In combination, an alternating-current electric motor, means for connecting said motor to a load, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, thermally-responsive protective means associated with the motor, said operating coils and thermally-responsive protective means being connected in a control circuit, and means for energizing said control circuit from a source of direct current, said protective means being adapted to effect deenergization of the control circuit in response to excessive heating of the motor.

5. In combination, an alternating-current electric motor, means for connecting said motor to a load, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, thermally-responsive protective means associated with the motor, said operating coils and thermally-responsive protective means being connected in a control circuit, means for energizing said control circuit from a source of direct current which is substantially independent of the alternating-current supply to the motor, said protective means being adapted to effect deenergization of the control circuit in response to excessive heating of the motor, and means for preventing energization of at least said brake operating coil in case of failure of the alternating-current supply to the motor.

6. In combination, an alternating-current electric motor, clutch means for connecting said motor to a load, said clutch means being normally disengaged, a clutch operating coil for effecting engagement of the clutch means, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, thermally-responsive protective means associated with the motor, said operating coils and thermally-responsive protective means being connected in a control circuit, and means for energizing said control circuit from a source of direct current, said protective means being adapted to effect deenergization of the control circuit in response to excessive heating of the motor.

7. In combination, an alternating-current electric motor, clutch means for connecting said motor to a load, said clutch means being normally disengaged, a clutch operating coil for effecting engagement of the clutch means, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, thermally-responsive protective means associated with the motor, said operating coils and thermally-responsive protective means being connected in a control circuit, means for energizing said control circuit from a source of direct current which is substantially independent of the alternating-current supply to the motor, said protective means being adapted to effect deenergization of the control circuit in response to excessive heating of the motor, and means for preventing energization of at least said clutch and brake operating coils in case of failure of the alternating-current supply to the motor.

8. In combination, an alternating-current electric motor, means for connecting said motor to a load, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, said operating coils being connected in series, means for energizing the series circuit comprising said operating coils from a source of direct current which is substantially independent of the alternating-current supply to the motor, and means for interrupting said circuit in response to failure of the alternating-current supply to the motor.

9. In combination, an alternating-current electric motor, clutch means for connecting said motor to a load, said clutch means being normally disengaged, a clutch operating coil for effecting engagement of the clutch means, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, said operating coils being connected in series, means for energizing the series circuit comprising said operating coils from a source of direct current which is substantially independent of the alternating-current supply to the motor, and means for interrupting said circuit in response to failure of the alternating-current supply to the motor.

10. In combination, an alternating-current electric motor, means for connecting said motor to a load, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, said operating coils being connected in parallel, means for energizing said operating coils from a source of direct current which is substantially independent of the alternating-current supply to the motor, and means for interrupting the circuit of at least said brake operating coil in response to failure of the alternating-current supply to the motor.

11. In combination, an alternating-current electric motor, clutch means for connecting said motor to a load, said clutch means being normally disengaged, a clutch operating coil for effecting engagement of the clutch means, braking means for stopping rotation of the load, said braking means being normally maintained in braking condition, a brake operating coil for releasing said braking means to permit the load to be driven by the motor, contact means for connecting the motor to a source of alternating current, an operating coil for effecting closing of said contact means, said clutch and brake operating coils being connected in series, and said contact means operating coil being connected in parallel with the clutch and brake operating coils, means for energizing said operating coils from a source of direct current which is substantially independent of the alternating-current supply to the motor, and means for interrupting the circuit of at least the clutch and brake operating coils in response to failure of the alternating-current supply to the motor.

12. In combination, an alternating-current electric motor, means for connecting said motor to a load, braking means for stopping rotation of the load, said braking means being normally maintained in braking condition, a brake operating coil for releasing said braking means to permit the load to be driven by the motor, a contactor having a plurality of contacts for connecting said motor to a source of alternating current, a contactor operating coil for effecting closing of said contacts, an additional contact on said contactor operable with the first-mentioned contacts, said additional contact being connected in series with said brake operating coil for connecting the brake operating coil to a source of direct current to be energized thereby, and means for connecting said contactor operating coil to said source of direct current.

13. In combination, an alternating-current electric motor, clutch means for connecting said motor to a load, said clutch means being normally disengaged, a clutch operating coil for effecting engagement of the clutch means, braking means for stopping rotation of the load, said braking means being normally maintained in braking condition, a brake operating coil for releasing said braking means to permit the load to be driven by the motor, a contactor having a plurality of contacts for connecting said motor to a source of alternating current, a contactor operating coil for effecting closing of said contacts, an additional contact on said contactor operable with the first-mentioned contacts, said additional contact being connected in series with said clutch and brake operating coils for connecting the clutch and brake operating coils to a source of direct current, and means for connecting said contactor operating coil to said source of direct current.

CYRIL G. VEINOTT.

REFERENCES CITED

The following references are of record in the file of this patent:

UNITED STATES PATENTS

| Number | Name | Date |
|---|---|---|
| 749,439 | Ihlder | Jan. 12, 1904 |
| 1,547,382 | Gourdier et al. | July 28, 1925 |
| 1,577,068 | Oberschmidt | Mar. 16, 1926 |
| 1,664,089 | Ringwald | Mar. 27, 1928 |
| 1,993,413 | Mellon | Mar. 5, 1935 |
| 2,018,720 | Hodgson | Oct. 29, 1935 |
| 2,034,708 | Browne et al. | Mar. 24, 1936 |
| 2,042,937 | Henricksen | June 2, 1936 |
| 2,254,029 | Chladek et al. | Aug. 26, 1941 |
| 2,314,019 | Shaw | Mar. 16, 1943 |
| 2,334,965 | Thacker | Nov. 23, 1943 |